UNITED STATES PATENT OFFICE.

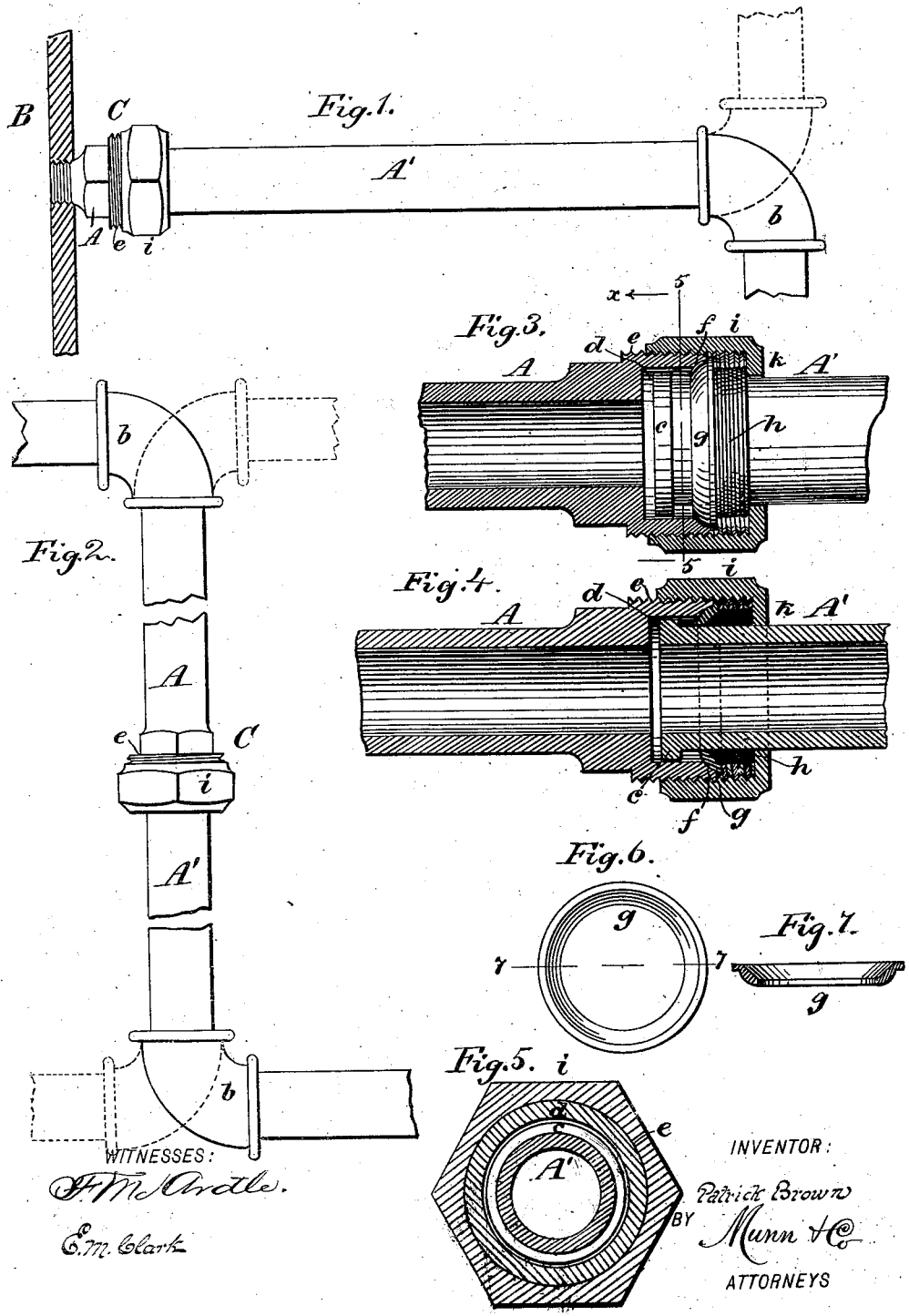

PATRICK BROWN, OF PHILADELPHIA, PENNSYLVANIA.

SWING AND EXTENSION PIPE-JOINT.

SPECIFICATION forming part of Letters Patent No. 461,311, dated October 13, 1891.

Application filed March 27, 1891. Serial No. 386,658. (No model.)

*To all whom it may concern:*

Be it known that I, PATRICK BROWN, of Philadelphia, in the county of Philadelphia and State of Pennsylvania, have invented a new and useful Improvement in Swing and Extension Pipe-Joints, of which the following is a full, clear, and exact description.

The object of my invention is to produce a pipe-joint for uniting either two pieces of pipe without elbow terminations or two pieces of pipe either or both of which have an elbow termination and to permit of either or both of said pipes freely contracting or expanding in direction of their length and of axially rotating without strain upon the joint and yet preserve a tight joint at all times, as well as of permitting of a uniformity of bore being used throughout the series of connected pipes.

The invention, which is applicable to both steam, water, oil, and other pipes, consists in a novel construction of pipe-joint, substantially as hereinafter described, and more particularly pointed out in the claim, whereby the above-named results are very perfectly attained, great convenience is afforded in adjusting the pipes, and breakage of them by expansion and contraction is prevented.

Reference is to be had to the accompanying drawings, forming a part of this specification, in which similar letters of reference indicate corresponding parts in all the figures.

Figure 1 represents a longitudinal view of a pipe connection as applied to a steam-boiler having an elbow at the end of the one pipe and with my improved joint applied. Fig. 2 is a longitudinal view of two pieces of pipe with elbow at the end of each, also with the joint applied. Fig 3 is an exterior longitudinal view of one piece of pipe, in part, with another length of pipe, in part, in section, as also the joint-piece or coupling uniting said pipes; Fig. 4, a longitudinal section of all the parts or pieces shown in Fig. 3. Fig. 5 is a transverse section upon the line 5 5 in Fig. 3, looking in drection of the arrow *x*. Fig. 6 is a rear view of a washer used in the joint, and Fig. 7 a transverse section of the same upon the line 7 7 in Fig. 6.

In Fig. 1, A indicates a stationary short pipe or nozzle screwed into the end B of a steam-boiler, and A' a pipe having an elbow *b* at its outer end and adapted to connect at its inner end with the nozzle or pipe A by a joint or coupling connection C, embodying my invention, and providing for the longitudinal expansion or contraction of the pipe A' and for swinging or turning it axially to change the position of the elbow in any required direction, but which is here simply shown by full and dotted lines in reverse positions. In Fig. 2 of the drawings the pipes A A' are both supposed to be capable of automatic longitudinal adjustment or contraction and expansion by means of the joint or coupling connection C, at their adjacent ends and of being axially turned, as required, to change the position of the elbows *b* at their opposite ends. In Figs. 3 and 4 a like construction of the joint is shown for connecting two straight pipes A A'. In all of these figures the pipes A A' may be of any desired length, or any number of them may be similarly joined together, and they may run in any required direction and each connected series of pipes be of the same interior diameter or bore.

The joint C, connecting the pipes A A', is made as follows: The pipe A' is constructed with an externally-projecting circular flange *c* at its connecting end, which flange is free as the pipe expands or contracts to move in or out of a circular enlarged box part or chamber *d* at the connecting end of the adjacent pipe A, and also to axially rotate therein for the purpose hereinbefore named or whenever required; or the two pipes A A' will by this fit of them, one within the other, be free to longitudinally expand or contract, and either or both of them may be axially rotated to swing or turn the elbow or elbows *b* at the outer end or ends of them, if so provided, in any required direction, and where there are elbows on both pipes to turn the same in reverse directions, if desired, as shown in Fig. 2, or it might be in the same direction.

To couple the pipes A A together at their adjacent ends and to form a joint which will provide for the double adjustment of the pipes, as just specified, and yet keep tight as against leakage, the chambered portion *d* of the pipe A has an external screw-thread *e* cut upon it and a beveled or concave seat $f$ made in its face end, and the other pipe A' has loosely slipped over it, back of the flange $c$, a dished washer $g$, adapted to fit the seat $f$, and in rear of this again the pipe A' has applied to or wound around it a packing $h$ of fibrous material, preferably asbestus in tape form. This packing $h$ and the packing ring or washer $g$ are both inclosed by or contained loosely within a nut $i$, having an internal screw-thread that engages with the screw-thread $e$ on the chambered end of the pipe A and having an inner projecting back flange $k$, that closely hugs the body of the pipe A'. By this construction and combination of parts on screwing up the nut $i$ so as to bring the washer $g$ in front of the packing $h$ up against its seat $f$ and arranging the pipes A A' so that the flange $c$ of the pipe A' stops short of the back of the chamber $d$, a tight joint is secured for the meeting end portions of the pipes, both peripherally and endwise, with freedom for the pipes to expand or contract or to be turned axially, as desired.

Having thus described my invention, I claim as new and desire to secure by Letters Patent—

In a pipe-joint, the engaging end of the one pipe constructed with an enlarged chamber having a screw-thread on its peripheral exterior and a concave seat on its face end, in combination with the engaging end of the adjacent pipe, constructed with an outer flange adapted to freely fit within said chamber, a washer encircling the flanged pipe back of the flange and adapted to fit the concave seat in the face end of the chambered portion of the adjacent pipe, a fibrous packing back of said washer, and a nut inclosing the washer and fibrous packing and having an internal screw-thread adapted to engage with the exterior screw-thread on the chambered portion of the adjacent pipe, also having an inner back flange constructed to hug the flanged pipe in rear of the packing, substantially as shown and described.

PATRICK BROWN.

Witnesses:
JESSE GILBERT,
TIMOTHY AHERIN.